(12) United States Patent
Setoda et al.

(10) Patent No.: US 10,493,555 B2
(45) Date of Patent: Dec. 3, 2019

(54) PENETRATION WELDING METHOD

(71) Applicant: HONDA MOTOR CO., LTD., Minato-Ku, Tokyo (JP)

(72) Inventors: Keishi Setoda, Tochigi (JP); Yosuke Hiruma, Tochigi (JP); Yusuke Muramatsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 15/552,880

(22) PCT Filed: Feb. 22, 2016

(86) PCT No.: PCT/JP2016/055045
§ 371 (c)(1),
(2) Date: Aug. 23, 2017

(87) PCT Pub. No.: WO2016/136663
PCT Pub. Date: Sep. 1, 2016

(65) Prior Publication Data
US 2018/0050417 A1 Feb. 22, 2018

(30) Foreign Application Priority Data
Feb. 23, 2015 (JP) ................ 2015-032787

(51) Int. Cl.
*B23K 10/00* (2006.01)
*B23K 10/02* (2006.01)
(Continued)

(52) U.S. Cl.
CPC .............. *B23K 10/02* (2013.01); *B23K 9/095* (2013.01); *B23K 31/00* (2013.01)

(58) Field of Classification Search
CPC .. B23K 10/02; B23K 9/0026; B23K 2103/04; B23K 9/05; B23K 9/173; B23K 10/027; B23K 3/00; H05H 1/26; H05H 1/36
(Continued)

(56) References Cited

U.S. PATENT DOCUMENTS 4,008,384 A * 2/1977 Cecil .................... B23K 9/0256
219/124.03
4,336,441 A * 6/1982 Godai ...................... B23K 9/23
219/137 WM
(Continued)

FOREIGN PATENT DOCUMENTS

JP   H09-103879 A   4/1997
JP   2013-099773 A   5/2013
(Continued)

OTHER PUBLICATIONS

Office Action issued in the corresponding Chinese Patent Application 201680011543.0 dated Dec. 3, 2018.
Office Action issued in the corresponding Chinese Patent Application 201680011543.0 dated Jul. 26, 2019.

*Primary Examiner* — Mark H Paschall
(74) *Attorney, Agent, or Firm* — Carrier Blackman & Associates, P.C.; Joseph P. Carrier; William D. Blackman

(57) ABSTRACT

A penetration welding method includes a plasma welding step for forming a through hole in a work, which is a laminated steel plate, from a front surface to rear surface thereof without forming a hole in a component at the rear, by generating a plasma arc column from a plasma torch to the work. After the plasma arc column is generated, the plasma arc column is extinguished when an arc voltage or the length of the arc estimated from the arc voltage exceeds an end-determining threshold which is determined according to the thickness of the work. Further, plasma gas is discharged from the plasma torch at a flow rate at which the width of the plasma arc column is maintained approximately constant (Continued)

from the plasma torch side to the work side so that the arc voltage is increased at an approximately constant rate before and after penetration.

7 Claims, 6 Drawing Sheets

(51) Int. Cl.
*B23K 31/00* (2006.01)
*B23K 9/095* (2006.01)

(58) Field of Classification Search
USPC ............ 219/137 R, 121.45, 121.46, 121, 59
See application file for complete search history.

(56) References Cited

U.S. PATENT DOCUMENTS

| | | | |
|---|---|---|---|
| 6,399,915 B1 * | 6/2002 | Mori | B23K 26/03 |
| | | | 219/121.83 |
| 9,604,301 B2 * | 3/2017 | Zhang | B23K 9/0956 |
| 10,052,707 B2 * | 8/2018 | Henry | B23K 35/3053 |
| 2015/0053656 A1 | 2/2015 | Popp et al. | |
| 2015/0283639 A1 * | 10/2015 | Henry | B23K 35/3053 |
| | | | 219/130.51 |

FOREIGN PATENT DOCUMENTS

| | | |
|---|---|---|
| JP | 2013-180309 A | 9/2013 |
| JP | 2014-213339 A | 11/2014 |
| WO | 2013/164076 A1 | 11/2013 |

* cited by examiner

BACKGROUND ART

PENETRATION WELDING METHOD

TECHNICAL FIELD

The present invention relates to a penetration welding method. In more detail, it relates to a penetration welding method that includes a penetration process of forming a through hole in layered steel sheets by causing a plasma arc column to be generated by a plasma torch.

BACKGROUND ART

Conventionally, as technology for joining layered steel sheets configured by overlapping two or more steel sheets, a penetration welding method by plasma-MIG welding has been known (e.g., refer to Patent Document 1). This penetration welding method includes the two processes of a plasma welding process of forming a through hole (so-called key-hole) in the layered steel sheets by way of a plasma arc generated by a plasma torch, and a MIG welding process of filling a filler into the above-mentioned through hole using a MIG torch, thereby backfilling this through hole. With such a penetration welding method, in order to realize sufficient strength, it has been important to form a through hole of a bore of sufficient size in the plasma welding process, which is the leading process, from a top surface of the layered steel sheets to the back surface.

FIG. 6 is a view showing the sequence of the plasma welding process described in Patent Document 1. With the technology of Patent Document 1, a through hole with a bore of sufficient size is formed in the layered steel sheets by performing the two processes of a hole digging process to cause a hole to penetrate from the top surface of the layered steel sheets to the back surface, and a melt diameter enlarging process of expanding the diameter of the through hole formed in the above process. Upon doing so, if controlling the arc current to a constant, since a proportional relationship is established between the length of the plasma arc column generated between the plasma torch and the layered steel sheets, and the arc voltage according to Ohm's law, the arc voltage will vary as shown at the bottom of FIG. 6. With the technology of Patent Document 1, it is determined that a hole penetrated from the top surface of the layered steel sheets to the back surface by detecting a sudden increase in arc voltage such as that shown by the dotted line in FIG. 6, and then the process advances from the hole digging process to the melt diameter enlarging process.

Patent Document 1: Japanese Unexamined Patent Application, Publication No. 2013-180309

DISCLOSURE OF THE INVENTION

Problems to be Solved by the Invention

However, with the above-mentioned technology of Patent Document 1, the increase rate of arc voltage during penetration (i.e. elongation rate of plasma arc column) is made as large as possible, by employing a source having a high open circuit voltage as the plasma power source for generating the arc voltage, so as to be able to accurately detect the timing at which the hole penetrates. However, when trying to make the increase rate of the arc voltage larger during penetration in this way, the plasma arc column that has suddenly extended during penetration will reach back components provided on the back surface side of the layered steel sheets serving as the target of welding, and there is a risk of an unintended hole being formed therein.

The present invention has an object of providing a penetration welding method that can form a through hole with a bore of sufficient size from the top surface of layered steel sheets to a back surface without forming a hole in back components.

Means for Solving the Problems

In order to achieve the above-mentioned objects, a first aspect of the present invention provides a penetration welding method including a through-hole formation step (e.g., S5 to S7 in FIG. 5) of forming a through hole in a work by way of generating a plasma arc column from a plasma torch (e.g., the plasma torch 31 described later) to a work (e.g., the work W described later) that is layered steel sheets, in which, after generating the plasma arc column in the through-hole formation step, the plasma arc column is eliminated in response to an arc voltage or an arc length estimated from the arc voltage having exceeded a threshold (e.g., the end judgment threshold described later) established according to a thickness of the work, and in which plasma gas of a flow-rate such that the width of the plasma arc column is maintained substantially constant from a side of the plasma torch to a side of the work is sprayed from the plasma torch in the through-hole formation step.

According to a second aspect of the present invention, in this case, it is preferable to further include a threshold determination step (e.g., S2 to S4 in FIG. 5) of measuring a distance between the plasma torch and a position of forming a through hole in the work using a laser displacement gauge (e.g., the laser displacement gauge 33 described later), and determining the threshold using the distance and the thickness of the work.

According to a third aspect of the present invention, in this case, it is preferable to further include a quality judgment step (e.g., S8 to S11 in FIG. 5) of measuring a melt diameter on a back surface side of the through hole formed in the work in the through-hole formation step, by way of a laser displacement gauge (e.g., the laser displacement gauge 33 described later), and judging quality of the through hole formed in the work based on the melt diameter measured.

Effects of the Invention

With the first aspect of the present invention, plasma gas of a flow-rate such that the width of the plasma arc column from the plasma torch side to the work side is maintained substantially constant is sprayed from the plasma torch. Then, after generating such a plasma arc column, the plasma arc column is eliminated in response to the arc voltage or the arc length estimated from the arc voltage (hereinafter this is also referred to as "arc voltage, etc.") having exceeded a predetermined threshold, and the process of forming the through hole is ended. In particular, with the present invention, it is possible to focus at the center of the plasma arc column the energy causing the work to melt, by generating a plasma arc column having a substantially constant width. When forming a through hole in the work using such a plasma arc column, contrary to the example shown in FIG. 6, the arc voltage, etc. during processing will increase at a substantially constant rate from the state of being a predetermined initial value until the through hole with an inside diameter corresponding to the width of the plasma arc is formed from the top surface to the back surface of the work, and it is possible to judge that the process has ended. In other words, in the time from after generating the plasma arc column until the through hole of a melt diameter according to the width of the plasma arc column is formed from the top surface to the back surface of the work is formed, the plasma arc column will not suddenly extend as does conventionally. Therefore, according to the present invention, it is possible to form a through hole of a melt diameter of sufficient size from the top surface to the back surface of the work, without forming a hole in a back component. In addition, according to the present invention, a process for detecting the existence of penetration that had been required conventionally while forming the through hole becomes unnecessary, and thus the process of forming a through hole can be simplified.

With the second aspect of the present invention, the aforementioned threshold is determined by employing the distance between the plasma torch and the position of forming the through hole in the work, which was measured using the laser displacement gauge, as well as the thickness of the work. With the present invention, since the arc voltage, etc. during processing increases at a substantially constant rate in the aforementioned way, the threshold for this arc voltage, etc. generally corresponds to a set point of the arc length at the end time of the through-hole formation process. With the present invention, by establishing the threshold corresponding to such a set point of the arc length using the plasma torch-work distance and the thickness of the work, it is possible to eliminate the plasma arc column at an appropriate timing after a through hole of appropriate melt diameter is formed in the work and prior to a hole forming in a back component.

With the third aspect of the present invention, the melt diameter on the back surface side of the through hole formed in the work is measured using a laser displacement gauge, and the adequacy of the through hole formed in the work is judged based on this melt diameter measured. In penetration welding in the aforementioned way, it is necessary to form a through hole having a melt diameter of an appropriate size from the top surface to the back surface of the work. In addition, in the through-hole formation process, the melt diameter on the top surface side of the work first spreads, and then the melt diameter on the back surface side of the work spreads. With the present invention, it is possible to judge whether a through hole of adequate melt diameter was formed from the top surface to the back surface by measuring the melt diameter on the back surface side of the through hole using a laser displacement gauge.

PREFERRED MODE FOR CARRYING OUT THE INVENTION

Figure 1:
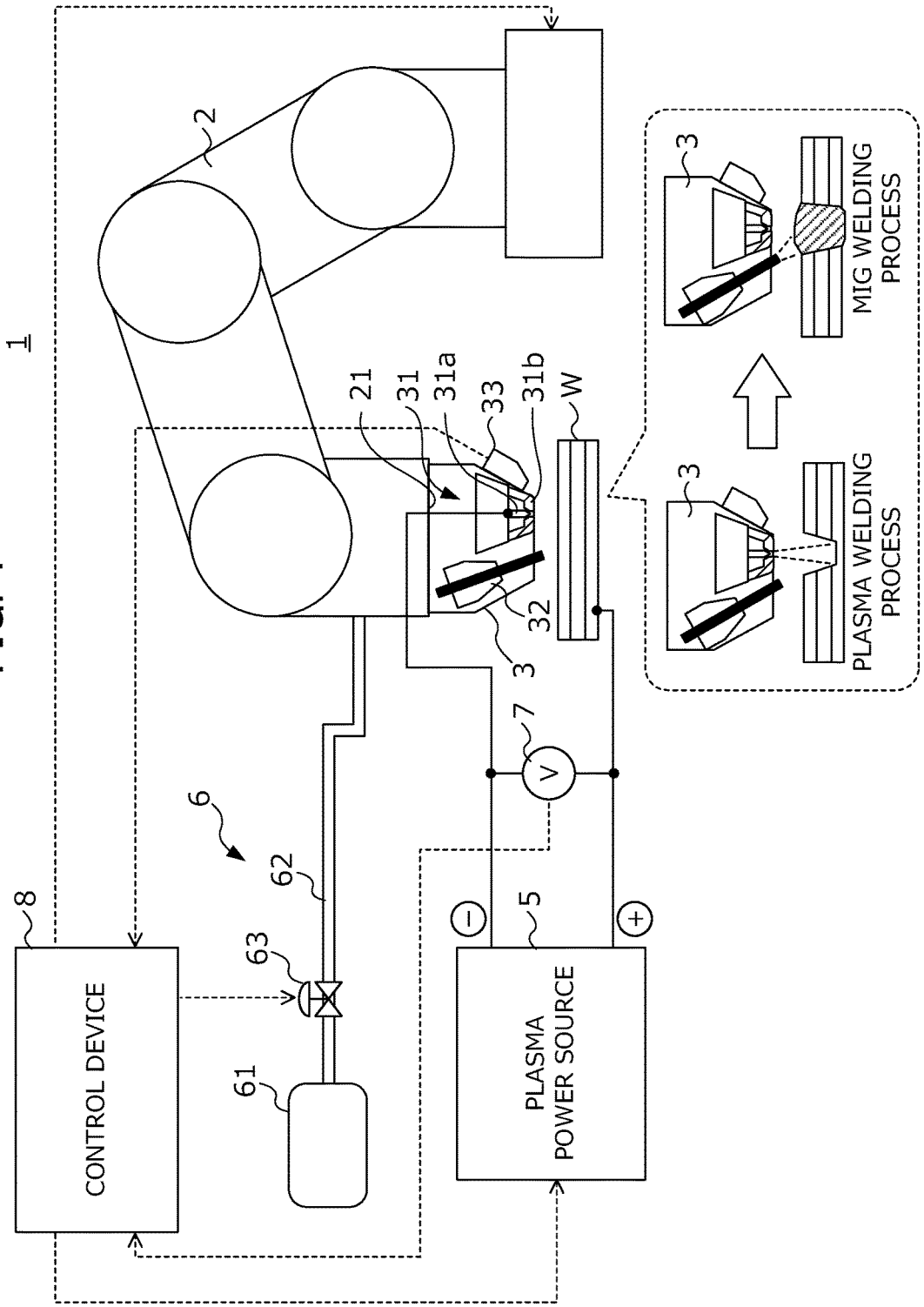
FIG. 1 is a view showing the configuration of a welding system to which the penetration welding method according to an embodiment of the present invention has been applied.

FIG. 1 is a view showing the configuration of a welding system 1 to which the penetration welding method according to an embodiment of the present invention has been applied. With layered steel sheets configured by overlapping a plurality of steel sheets serving as a work W, the welding system 1 joins a each steel sheet by applying the penetration welding method according to plasma-MIG welding described later to this work W. Hereinafter, a case of using layered steel sheets consisting of three steel sheets as the work W will be explained; however, the present invention is not limited thereto. The steel sheets constituting the work W maybe two sheets or four or more sheets. In addition, there may be a gap between each steel sheet.

As schematically shown in FIG. 1, the penetration welding method by plasma-MIG welding is constituted by the two processes of a plasma welding process and a MIG welding process. The plasma welding process is the leading process, and is a process of forming a through hole in the layered steel sheets by way of a plasma arc column. The MIG welding process is the following process, and is a process that fills a filler into the through hole formed by the plasma welding process to backfill this through hole. Among these two processes, the contents of the plasma welding process that is the leading process, and the device used upon performing this plasma welding process will be explained in detail hereinafter, and the explanations for the contents of the MIG welding process that is the following process, and the device used upon performing this MIG welding process will be simplified.

The welding system 1 is configured to include a robot 2 to which a welding torch 3 is provided, a plasma power source 5, a gas supply device 6, a voltage detector 7, and a control device 8 that controls these to execute the plasma welding process and MIG welding process.

The robot 2 is a multi-axis articulated welding robot, for example. The welding torch 3 is provided at an arm leading end 21 of the robot 2. The position and posture of the welding torch 3 are controlled by moving each joint of the robot 2 following a teaching program established in advance in the control device 6.

The welding torch 3 includes a plasma torch 31, MIG torch 32, and laser displacement gauge 33.

The plasma torch 31 is a welding torch that is used upon forming a through hole penetrating from the top surface to the back surface of the work W in the plasma welding process. It should be noted that, among the two surfaces of the plate-like work W, the surface of the plasma torch 31 side is defined as the top surface, and the surface on the opposite side thereof is defined as the back surface. The plasma torch 31 includes a rod-like electrode 31a, and a cylindrical nozzle 31b provided at the surroundings of this electrode 31a. The anode of the plasma power source 5 described later is connected to the electrode 31a, and the cathode is connected to the work W. The nozzle 31b is connected to the gas supply device 6 described later. It should be noted that illustrations and a detailed explanation will be omitted for configurations such as of the nozzle that sprays shielding gas to be used for preventing oxidation of the melt pool formed in the work W during processing.

The plasma arc for welding is generated according to the following sequence is generated between the plasma torch 31 and the work W. First, when applying a high-frequency voltage between the electrode 31a and the water-cooled nozzle 31b using a pilot arc power source that is not illustrated, a pilot arc for inducing a plasma arc for welding is generated between these. In addition, when supplying plasma gas from the gas supply device 6 to the nozzle 31b while such a pilot arc is generated, the plasma gas is ionized inside the nozzle 31b and ejected towards the work W. The ionized plasma gas becomes a good conductor of the arc current, whereby the electrical conductance between the electrode 31a and work W is ensured, and thus the plasma arc for welding is generated (struck).

The MIG torch 32 is a welding torch used, after the through hole was formed in the work W using the aforementioned plasma torch 31, upon strongly joining the respective steel sheets constituting the work W by filling this through hole by MIG welding. The MIG torch 32 backfills the through hole by way of MIG welding with the filler fed from a filler feed device that is not illustrated serving as the consumable electrode.

The laser displacement gauge 33 includes an illumination device that irradiates a laser beam towards the work W, and a light receiving device that receives a laser beam reflected from the work W. The control device 8 can measure the distance between the nozzle 31b of the plasma torch 31 and a predetermined processing position on the work W, the melt diameter on the back surface side of the through hole formed at the processing position of the work W, etc. using this laser displacement gauge 33.

The plasma power source 5 converts three-phase AC electricity to DC electricity, and supplies this to the plasma torch 31. The cathode of the plasma power source 5 is connected to the work W, and the anode is connected to the electrode 31a of the plasma torch 31. The plasma power source 5, after electrical conduction is ensured between the electrode 31a and work W using the pilot arc power source that is not illustrated, controls the arc current between this electrode 31a and work W. This plasma power source 5 includes a constant current function for controlling the plasma current flowing between the electrode 31a and work W to a constant. Therefore, since a proportional relationship is established between the arc voltage generated between the plasma torch 31 and the work W, and the length of the plasma arc column extending from the plasma torch 31 to the work W (i.e. arc length), it is possible to estimate the arc length based on the arc voltage. The control device 8 generates and eliminates the plasma arc for welding between the plasma torch 31 and work W, by connecting and disconnecting the plasma power source 5 and electrode 31 during execution of the plasma welding process.

The voltage detector 7 detects the arc voltage between the electrode 31a of the plasma torch 31 and the work W in the plasma welding process, and sends the detected value to the control device 8.

The gas supply device 6 includes a compressed gas cylinder 61 that stores plasma gas and shielding gas, a gas flow channel 62 connecting between the compressed gas cylinder 61 and the nozzle 31b of the plasma torch 31, and a flow-rate control valve 63 provided to the gas flow channel 62. As the plasma gas and shielding gas, argon gas can be used, for example. The control device 8 adjusts the flow-rate of plasma gas and the flow-rate of the shielding gas spraying from the nozzle 31b, by adjusting the aperture of the flow-rate control valve 63, during execution of the plasma welding process.

Figure 2:
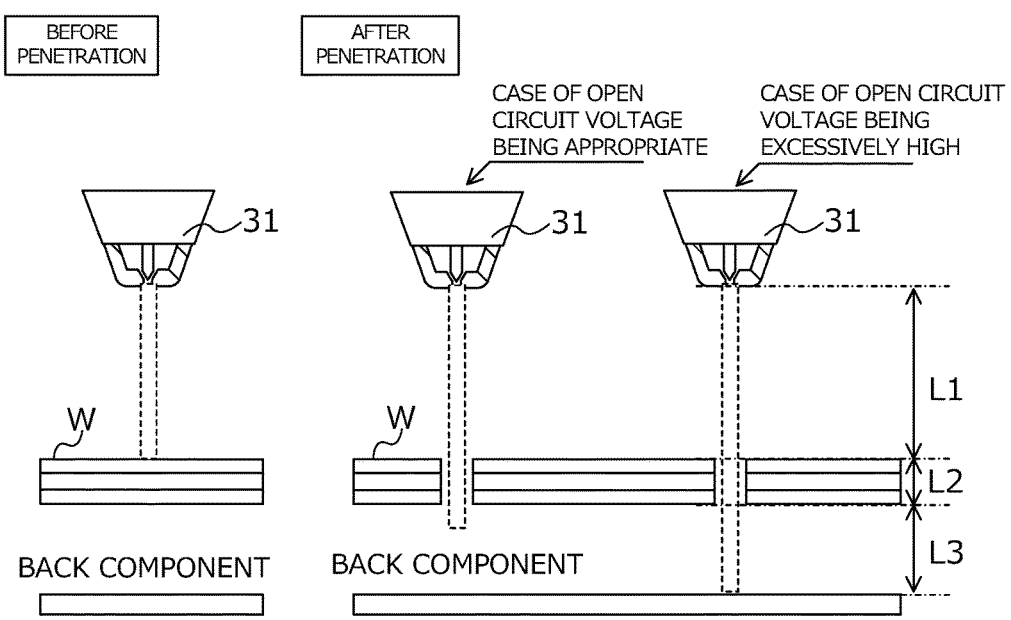
FIG. 2 is a view schematically showing a state of a plasma arc column when forming a through hole by melting part of a work.

Next, a preferred setting range of the open circuit voltage of the main arc power source (voltage between terminals of the plasma power source during open circuit) will be explained by referencing FIG. 2. FIG. 2 is a view schematically showing a state of the plasma arc column when forming a through hole by melting a part of the work W. The left side of FIG. 2 shows prior to penetration (prior to the bottom of the hole formed in the top surface of the work W reaching the back surface), and the right side of FIG. 2 shows immediately after penetration (immediately after the bottom of the hole formed in the top surface of the work W reaches the back surface).

As shown on the left side of FIG. 2, the plasma arc column extends from the plasma torch 31 until the bottom of the hole formed in the top surface of the work W prior to penetration. Therefore, prior to penetration, the arc length or arc voltage increases in proportion to the depth of the hole formed in the top surface of the work W.

On the other hand, as shown on the right side of FIG. 2, when the bottom of the hole reaches the back surface of the work W and penetrates, the plasma arc column suddenly extends because the obstructing matter no longer exists. On this occasion, the arc length and elongation rate thereof increase in proportion to the unique open circuit voltage of the plasma power source. Therefore, when using a plasma power source having an excessively high open circuit voltage, the plasma arc column will reach so far as back components provided on the back surface side of the work W immediately after penetration, and may form a hole in a back component.

Therefore, the open circuit voltage of the plasma power source is established by considering the plasma torch-work distance L1, the thickness L2 from the top surface of the work to the back surface, and the work-back component distance L3. In other words, so that the penetration of the work is ensured, the open circuit voltage is set so that the arc length at the instant of the hole penetrating is longer than the distance from summing the plasma torch-work distance L1 and the thickness L2 of the work W. In addition, in order to prevent a part of a back component from melting and a hole forming therein, the open circuit voltage is set so as to be shorter than a distance from summing the plasma torch-work top surface distance L1, the thickness L2 of the work W, and the work-back component distance L3. It should be noted that these distances L1, L2 and L3 respectively differ according to the processing position at which a through hole is sought to be formed in the work W, and the open circuit voltage is a unique value to the plasma power source and basically cannot be changed. Therefore, the open circuit voltage of the plasma power source is decided so that both penetration of the hole and protection of the back components are ensured at all processing positions, by using the average value, minimum value, maximum value, etc. of the assumed distances L1, L2 and L3.

Figure 3:
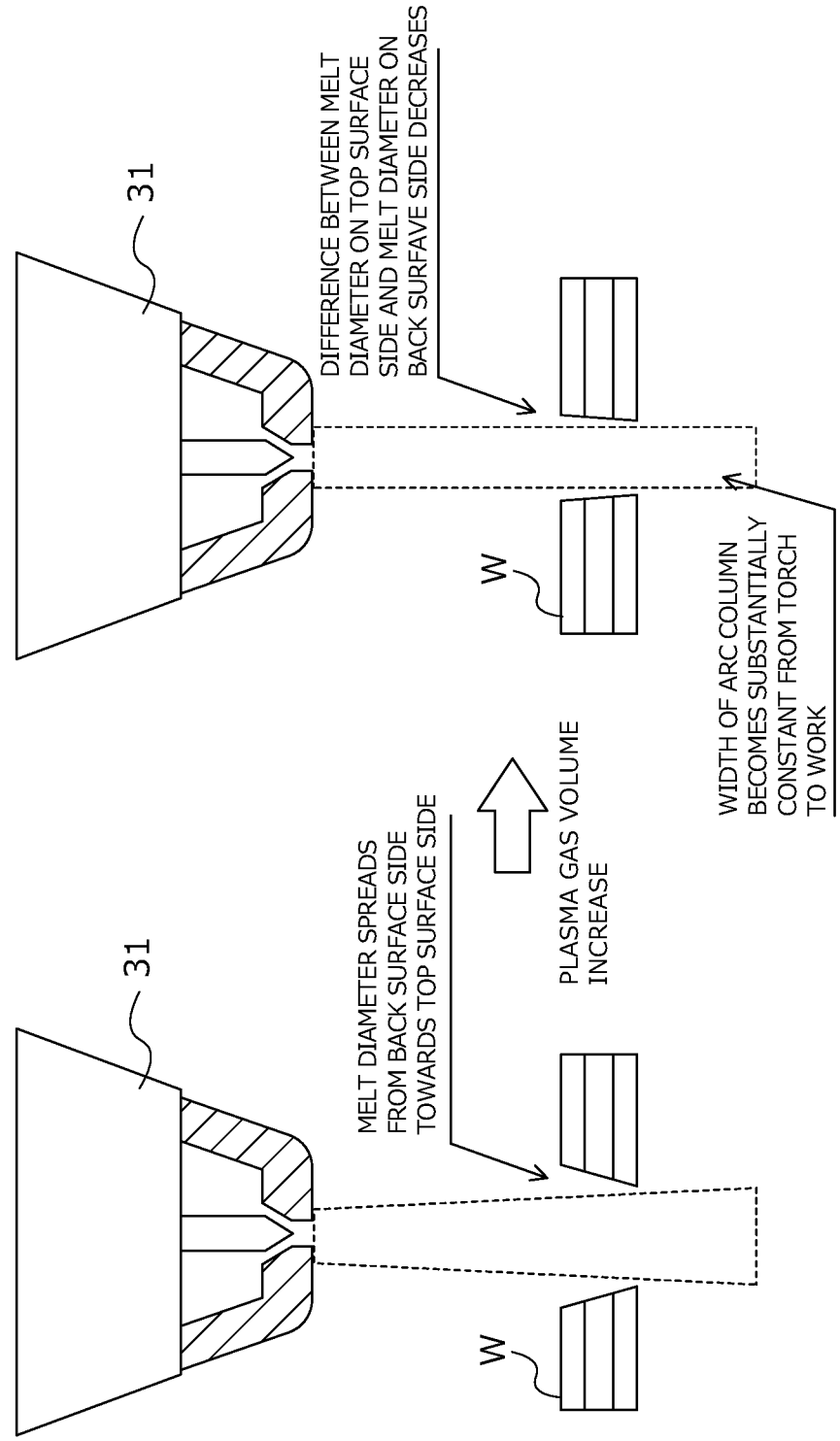
FIG. 3 is a view schematically showing a state of a through hole of a work at the moment of processing completion.

Next, the influence that the flow-rate of plasma gas exerts on the shape of the through hole when processing ends and on the change in arc voltage during processing will be considered by referencing FIG. 3.

FIG. 3 is a view schematically showing a state of a through hole in the work W at the moment of processing end. In FIG. 3, the moment of processing end refers to the time at which the melt diameter on the back surface side of the work W exceeds the targeted size after the bottom of the hole formed in the top surface of the work W reaches the back surface and penetrates, by continually generating the plasma arc from the plasma torch 31 to the top surface of the work W. The right side of FIG. 3 shows a case of causing the flow-rate of plasma gas to increase more than the left side.

Figure 6:
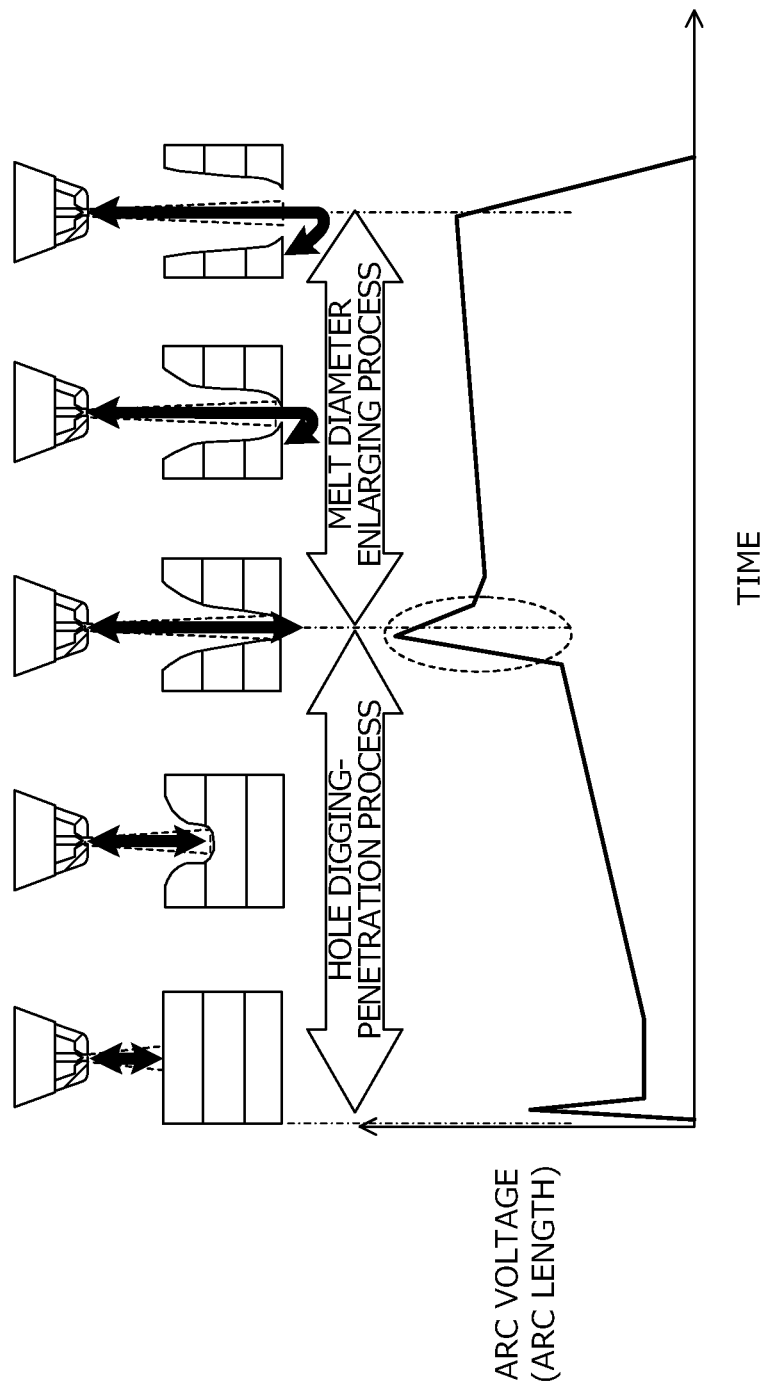
FIG. 6 is a view showing the sequence of a conventional plasma welding process.

When continually generating the plasma arc between the plasma torch 31 and the top surface of the work W, the through hole penetrating from the top surface of the work W to the back surface is formed. On this occasion, if the flow-rate of plasma gas is decreased, the width of the plasma arc column extending from the plasma torch 31 will widen from the plasma torch 31 side towards the work W, as shown on the left side of FIG. 3. For this reason, the energy of the plasma arc at the top surface of the work W will spread from the center to outwards, and a wider area will melt as approaching the top surface of the work W. As a result, the melt diameter of the through hole formed at the processing end time spreads from the back surface side to the top surface side, as shown on the left side of FIG. 3. In addition, as explained referencing FIG. 6, when processing with a plasma arc column that spreads out in such a way, immediately after penetrating the work from the top surface to the back surface until when the melt diameter on the back surface side of the work becomes the preferred size, the arc length suddenly extends, and a hole may form in a back component.

On the other hand, if increasing the flow-rate of the plasma gas to greater than a predetermined amount, the straightness of the plasma arc increases, and the width of the plasma arc column comes to be maintained substantially constant from the plasma torch 31 side to the work W, as shown on the right side of FIG. 3. For this reason, since the energy of the plasma arc focuses at the center, the difference between the melt diameter at the back surface side and the melt diameter at the top surface side of the through hole finally formed will decrease, as shown on the right side of FIG. 3. In other words, by focusing the energy at the center, it is possible to prevent the melt diameter on the back surface side from greatly spreading out during processing.

Figure 4:
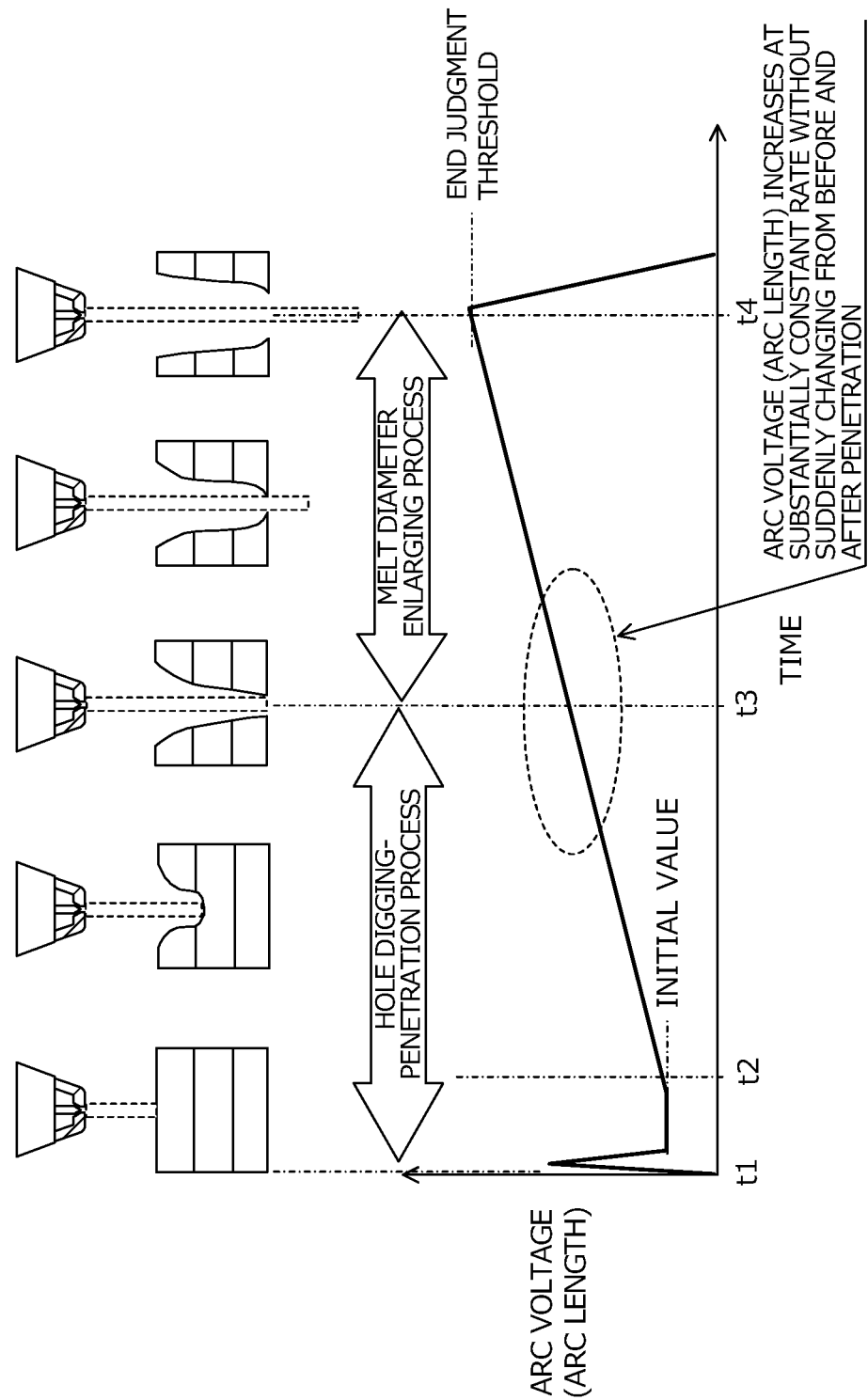
FIG. 4 is a view showing the change in arc voltage or arc length during execution of a plasma welding process in a case of using a plasma arc column of a form with a substantially constant width.

FIG. 4 is a view showing the change in arc voltage or arc length during execution of the plasma welding process in the case of using a plasma arc column with a width of substantially constant shape such as that shown on the right side of FIG. 3. FIG. 4 is a view showing the change in arc voltage from after starting the process by generating the plasma arc at time t1, until subsequently eliminating the plasma arc (extinguishing the arc) in response to the melt diameter on the back surface side of the work exceeding the targeted size at time t4, and ending the process.

As shown in FIG. 4, the plasma welding process is formally divided into the two processes of a hole digging-penetration process of penetrating from the top surface to back surface by digging into the hole on the top surface of the work, and a melt diameter enlarging process of expanding the inside diameter of the penetrated hole to a targeted diameter.

First, when generating a plasma arc at time t1, the arc voltage suddenly rises due to insulation breakdown of the work, followed by dropping again, and stabilizing at a predetermined value. Hereinafter, the value at which the arc voltage stabilizes after generation of the plasma arc is referred to as the initial value of the arc voltage. This initial value of the arc voltage corresponds to the plasma torch-work distance.

The arc voltage also rises from the initial value due to the top surface of the work melting and the bottom of the hole starting to decline at time t2. Subsequently, at time t3, the bottom of the hole reaches the back surface of the work, thereby advancing to the melt diameter enlarging process formally. At time t3 and after, the melt diameter of the through hole is expanded from the top surface side to the back surface side gradually. Then, at time t4, the plasma arc is eliminated in response to the melt diameter on the back surface side of the through hole exceeding the targeted size, thereby ending the plasma welding process.

In addition, as shown in FIG. 4, when using a plasma arc column made by concentrating energy at the center thereof, the arc voltage increases at a substantially constant rate from the time t2 at which the bottom of the hole begins to decline, until time t4 at which the melt diameter on the back surface side of the through hole becomes the targeted size. In other words, the arc voltage will not greatly rise at the timing of switching from the hole digging-penetration process to the melt diameter enlarging process. For this reason, a process for detecting the existence of penetration of the work like that explained referencing FIG. 6 will not be necessary. In addition, when the variation rate of the arc voltage becomes substantially constant in this way, since it is possible to determine the timing at which to eliminate the plasma arc from only a comparison between the measured value of the arc voltage and a predetermined threshold, the plasma welding process can be made simpler than the example shown in FIG. 6. Hereinafter, the threshold used in order to determine the timing of eliminating the plasma arc is referred to as end judgment threshold.

The flow-rate of plasma gas used in the plasma welding process of the present embodiment is decided so that the above such effects are obtained. More specifically, the flow-rate of plasma gas is decided so that the width of the plasma arc column is maintained substantially constant from the plasma torch side to the work side. In other words, the flow-rate of plasma gas is decided so that the arc voltage or arc length increases at a substantially constant rate until the arc voltage attains the end judgment threshold from the initial value. More specifically, in the case of using a plasma torch with a nozzle diameter of 2.5 mm, a plasma arc column is formed with a substantially constant width to the extent that the above-mentioned effects are obtained, by setting the flow-rate of the plasma gas to at least 10 (L/min). It should be noted that the flow-rate of plasma gas is preferably set to no more than 20 (L/min) in order to prevent wasted consumption of gas; however, this is not deciding the upper limit of the flow-rate. The straightness of the plasma arc column increases with greater flow-rate, and the aforementioned effects become more remarkable; therefore, the flow-rate of plasma gas may be set to 20 (L/min) or higher.

Figure 5:
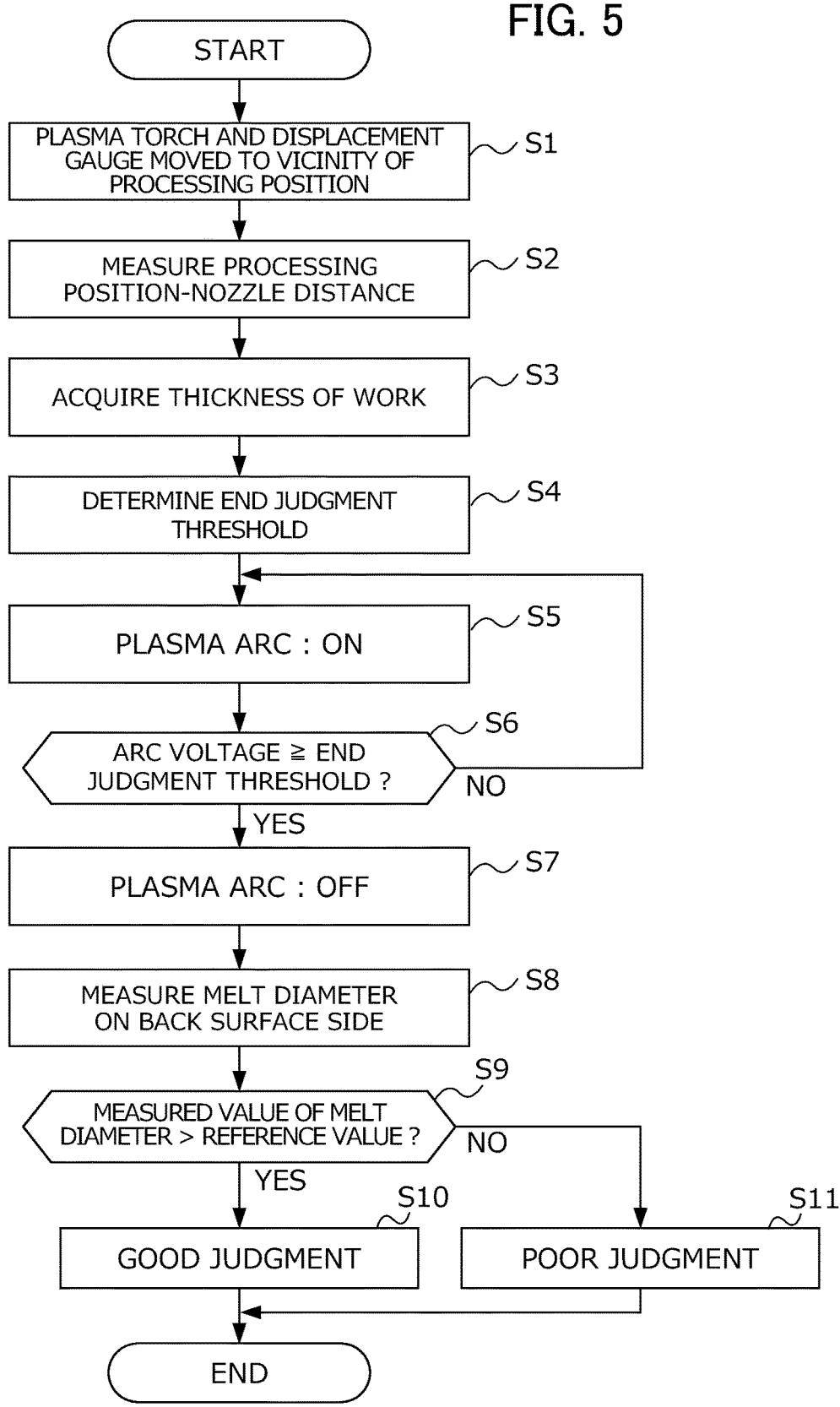
FIG. 5 is a flowchart showing a sequence of forming one through hole at a processing position determined in advance of a work, in the plasma welding process.

Next, the specific sequence of the plasma welding process using the above-mentioned welding system will be explained by referencing FIG. 5. FIG. 5 is a flowchart showing a sequence of forming one through hole at a processing position decided in advance of the work in the plasma welding process.

In S1, the control device controls a robot to cause the plasma torch and laser displacement gauge to move to the vicinity of the processing position on the top surface side of the work. In S2, the control device measures the distance between the position of the nozzle of the plasma torch and the processing position on the top surface of the work (hereinafter referred to as "nozzle-processing position distance"), using the laser displacement gauge. In S3, the control device acquires the thickness of the work at the processing position presently targeted (distance from back surface to top surface), by reading the data related to the thickness of the work recorded in a storage device that is not illustrated.

In S4, the control device determines the end judgment threshold using the nozzle-processing position distance acquired in S2 and the thickness of the work acquired in S3. More specifically, the control device determines the end judgment threshold so that a distance obtained by summing the nozzle-processing position distance, thickness of the work and a predetermined positive margin becomes the arc length at the moment of processing end, by converting this distance obtained by summing into arc voltage. By further summing a margin with the nozzle-processing position distance and the thickness of the work in this way, a state is secured in which the plasma arc column extends to the back surface side of the work at the moment of processing end, and the melt diameter on the back surface side of the through hole reaches a predetermined target. It should be noted that, in order to configure so that the plasma arc column does not reach back components at the moment of processing end, the above-mentioned margin is set to a sufficiently small value that is a positive value.

In S5, the control device starts the process of forming the through hole by generating the plasma arc column from the plasma torch to the work using the plasma power source and the gas supply device, as well as starting the observation of the arc voltage using the voltage detector. Herein, the flow-rate of plasma gas spraying from the plasma torch is adjusted to a magnitude such that the width of the plasma arc column from the plasma torch side to the work side is maintained substantially constant, as explained by referencing FIGS. 3 and 4. In S6, the control device judges whether the arc voltage has exceeded the aforementioned end judgment threshold. In the case of the judgment in S6 being NO, the control device returns to S5, and continues to generate the plasma arc. In addition, in the case of the judgment in S6 being YES, the processing advances to S7.

In S7, the control device eliminates the plasma arc column in response to the arc voltage exceeding the end judgment threshold. In S8, the control device measures the melt diameter on the back surface side of the through hole formed in the work using the laser displacement gauge. In S9, the control device judges the adequacy of the through hole formed in the work according to the above processing, by comparing between the measured value of the melt diameter on the back surface side acquired in S8 and a permitted value for the melt diameter established in advance. More specifically, in the case of the measured value of the melt diameter being larger than the permitted value, it is judged that the quality of the through hole is "good" (refer to S10), and in the case of the measured value being no more than the permitted value, it is judged that the quality of the through hole is "poor" (refer to S11), and the plasma welding process of FIG. 5 is ended.

It should be noted that the processing in FIG. 5 ends for the predetermined processing position in the work, and after the through hole is formed, the through hole formed at this processing position is then backfilled by performing the MIG welding processing that is not illustrated. It should be noted that, in the case of judging that the quality of the through hole is "poor" according to the processing of S11, it may be configured so as to inform and call the attention of the operator to this matter, or may be configured so as to perform the processing of FIG. 5 again for the same processing position, and then perform the MIG welding process.

It should be noted that the present invention is not to be limited to the above-mentioned embodiment, and that modifications, improvements, etc. within a scope that can achieve the objects of the present invention are also encompassed by the present invention.

Although the timing at which to eliminate the plasma arc column is determined in the above-mentioned embodiment by setting an end judgment threshold as the threshold for the arc voltage, and then comparing between the arc voltage and the end judgment threshold, the present invention is not to be limited thereto. Since a proportional relationship is established between the arc voltage and the arc length, the end judgment threshold may be set for the arc length instead of the setting for the arc voltage. The same effects will be exerted thereby.

The invention claimed is:

1. A penetration welding method comprising:
   a step of sensing a thickness before processing at a processing position of a work;
   a threshold determination step of determining a threshold based on the sensed thickness before processing at the processing position of the work; and
   a through-hole formation step of forming a through hole in the work by generating a plasma arc column from a plasma torch to the work,
   wherein the work is layered steel sheets,
   wherein the plasma torch has an electrode connected to a power source and a nozzle connected to a plasma gas supply device,
   wherein the threshold is for a for a variable selected from a group consisting of an arc voltage and an arc length of the plasma arc column estimated from the arc voltage,
   wherein in the through-hole formation step, generation of the plasma arc column is terminated in response to the variable having exceeded the threshold, and
   wherein a flow-rate of the plasma gas as sprayed from the plasma torch is adjusted such that the width of the plasma arc column is maintained substantially constant from a side of the plasma torch to a side of the work in the through-hole formation step.

2. The penetration welding method according to claim 1, wherein the threshold determination step involves measuring a distance between the plasma torch and the processing position of the work using a laser displacement gauge, and determining the threshold by obtaining a sum of a measured distance, the sensed thickness before processing, and a predetermined positive distance, and converting the sum into a voltage.

3. The penetration welding method according to claim 1, further comprising a quality judgment step of measuring a melt diameter on a back surface side of the through hole formed in the work in the through-hole formation step, by way of a laser displacement gauge, and judging quality of the through hole formed in the work based on the melt diameter measured.

4. The penetration welding method according to claim 2, further comprising a quality judgment step of measuring a melt diameter on a back surface side of the through hole formed in the work in the through-hole formation step, by way of a laser displacement gauge, and judging quality of the through hole formed in the work based on the melt diameter measured.

5. The penetration welding method according to claim 1, wherein in the through-hole formation step flow-rate of the plasma gas is adjusted to at least 10 L/min.

6. The penetration welding method according to claim 5, wherein in the through-hole formation step the flow-rate of the plasma gas is adjusted to 20 L/min or less.

7. The penetration welding method according to claim 6,
   wherein a back component is provided on the back surface side of the work with a distance between the work and the back component,
   wherein the method further includes a step of sensing a distance between the plasma torch and the processing position, and
   wherein in the through-hole formation step, an open circuit voltage of the power source is set so that the arc length at a moment when the through hole penetrates through the work is longer than a first distance obtained by summing a sensed distance between the plasma torch and the processing position and the sensed thickness before processing, and shorter than a second distance obtained by summing the first distance and the distance between the work and the back component.

* * * * *